United States Patent
Hussain et al.

(10) Patent No.: US 6,690,380 B1
(45) Date of Patent: Feb. 10, 2004

(54) GRAPHICS GEOMETRY CACHE

(75) Inventors: Zahid Hussain, San Jose, CA (US); Radomir Mech, Mountain View, CA (US); Gianpaolo Tommasi, San Carlos, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/473,209

(22) Filed: Dec. 27, 1999

(51) Int. Cl.[7] .................................................. G09G 5/36
(52) U.S. Cl. .................. 345/557; 711/118; 711/119; 711/122; 711/140; 711/154; 711/168; 345/619
(58) Field of Search .............................. 345/420, 423, 345/544, 501; 711/136, 216, 207, 203, 120, 3; 709/248

(56) References Cited

U.S. PATENT DOCUMENTS

| | | | | |
|---|---|---|---|---|
| 5,530,834 A | * | 6/1996 | Colloff et al. ............... | 711/136 |
| 5,659,699 A | * | 8/1997 | Breternitz, Jr. ............. | 711/216 |
| 5,821,940 A | * | 10/1998 | Morgan et al. ............. | 345/420 |
| 5,914,726 A | * | 6/1999 | Schultz ....................... | 345/501 |
| 5,974,238 A | * | 10/1999 | Chase, Jr. .................... | 709/248 |
| 6,130,680 A | * | 10/2000 | Cox et al. .................... | 345/544 |
| 6,342,884 B1 | * | 1/2002 | Kamen et al. .............. | 345/423 |

* cited by examiner

Primary Examiner—Matthew C. Bella
Assistant Examiner—Dalip K. Singh
(74) Attorney, Agent, or Firm—Woodcock Washburn LLP (57) ABSTRACT

A graphics geometry cache. The basic idea of one embodiment in accordance with the present invention is to utilize a graphics geometry cache together with a graphics pipeline. The graphics geometry cache is a relatively small cache (e.g., 128 entries) used for storing and maintaining vertex data. Specifically, the results of computations performed on vertices by the graphics pipeline (e.g., transformed vertices and attributes such as color) are cached within the graphics geometry cache. Furthermore, the cached entries are tagged by their corresponding vertex coordinates. Subsequently, when a particular vertex is specified for the graphics pipeline, a tag compare is executed through a hashing function to determine whether the graphics geometry data for that particular vertex is stored within the graphics geometry cache. If a hit occurs during the tag compare, a copy of the graphics geometry data is retrieved from the graphics geometry cache rather than having to recompute the graphics geometry data for that particular vertex. Therefore, one of the advantages of the graphics geometry cache of the present embodiment is that it saves computational resources.

24 Claims, 3 Drawing Sheets

GRAPHICS GEOMETRY CACHE

TECHNICAL FIELD

The present invention relates to the field of generating images and data which are eventually displayed. More specifically, the present invention relates to the field of graphics pipelines.

BACKGROUND ART

Computers are useful functional devices which are fabricated in a variety of sizes ranging from computers which occupy large office space down to computers which are held in one's hand. These varying sizes of computers also perform an extremely wide variety of useful operations, depending on the software which is installed within their particular memory storage device. For instance, computers can manage numerous financial transactions of a bank, control the fabrication of items ranging from automobiles down to integrated circuit chips, store addresses and telephone numbers of acquaintances, enable someone to produce and edit documents, along with transmitting and receiving data. It is appreciated that part of the process of providing many useful operations, computers typically utilize some type of display device (e.g., a cathode ray tube, a liquid crystal display, and the like) in order to display images and data which are recognizable to their users. As such, computers typically incorporate functionality for generating images and data which are subsequently output to the display device.

One typical prior art technique for generating computer images and viewable data within a computer system is to utilize a graphics pipeline, which includes several different stages of functionality. Basically, the typical prior art graphics pipeline of a computer system enables different graphics data to be processed in parallel, thereby generating graphics images at a faster rate and also utilizing the resources of the computer system more efficiently.

Specifically, sets of graphics primitives are specified within the computer system and are subsequently sent down the graphics pipeline. Within the typical graphics pipeline, there are different functional blocks of circuitry. Each functional block of the typical graphics pipeline sequentially performs a different function or functions on the received graphics primitives and then passes that data onto the following functional block. Eventually, the graphics pipeline manipulates the graphics primitives in order to produce the final pixel values of an image. As such, the typical graphics pipeline is used to produce final pixel values of an image in a manner which is analogous to the way an assembly line process is used to eventually manufacture an automobile. It should be appreciated that the functionality of a typical prior art graphics pipeline is well known by those of ordinary skill in the art. It should be further appreciated that there are disadvantages associated with a typical prior art graphics pipeline.

One of the disadvantages associated with a typical prior art graphics pipeline is that it is not efficient during its operation. For instance, during operation the typical prior art graphics pipeline can recalculate particular vertex data corresponding to a specific vertex multiple times. Specifically, since a vertex can be used for more than one primitive, the typical prior art graphics pipeline often recalculates particular vertex data multiple times for the same vertex with respect to independent primitives, polygonal meshes, and connected primitives. Therefore, the typical prior art graphics pipeline does not operate efficiently.

Accordingly, a need exists for a method and system for providing increased operational efficiency to a graphics pipeline which is functioning in conjunction with a computer system.

DISCLOSURE OF THE INVENTION

The present invention provides a method and system for providing increased operational efficiency to a graphics pipeline which is functioning in conjunction with a computer system. The basic idea of one embodiment in accordance with the present invention is to utilize a graphics geometry cache together with a graphics pipeline. The graphics geometry cache is a relatively small cache (e.g., 128 entries) used for storing and maintaining vertex data. Specifically, the results of computations performed on vertices by the graphics pipeline (e.g., transformed vertices and attributes such as color) are cached within the graphics geometry cache. Furthermore, the cached entries are tagged by their corresponding vertex coordinates. Subsequently, when a particular vertex is specified for the graphics pipeline, a tag compare is executed through a hashing function to determine whether the graphics geometry data for that particular vertex is stored within the graphics geometry cache. If a hit occurs during the tag compare, a copy of the graphics geometry data is retrieved from the graphics geometry cache rather than having to recompute the graphics geometry data for that particular vertex. Therefore, one of the advantages of the graphics geometry cache of the present embodiment is that it saves computational resources.

Specifically, one embodiment of the present invention includes a method for improving performance of a graphics pipeline. The method includes the step of caching graphics data corresponding to a vertex shared by a plurality of primitives of a graphics image. Furthermore, the method also includes the step of retrieving the graphics data corresponding to the vertex to be utilized in a graphics pipeline.

In another embodiment, the present invention also includes a method for improving performance of a graphics pipeline. The method includes the step of caching graphics data corresponding to a vertex of a graphics image within a first memory device. Additionally, the method includes the step of caching the graphics data corresponding to the vertex within a second memory device. Moreover, the method includes the step of retrieving the graphics data corresponding to the vertex from the second memory device to be utilized in a graphics pipeline.

In still another embodiment, the present invention includes the steps of the above described embodiment and further includes the step of determining whether the graphics data corresponding to the vertex is cached within the first memory device.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detail description of the present invention, numerous specific details are set forth in order to provide a thorough understanding of the present invention. However, it will be obvious to one of ordinary skill in the art that the present invention may be practiced without these. specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "caching" or "computing" or "generating" or "retrieving" or "determining" or "outputting" or "performing" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

COMPUTER SYSTEM ENVIRONMENT OF THE PRESENT INVENTION

Figure 1:
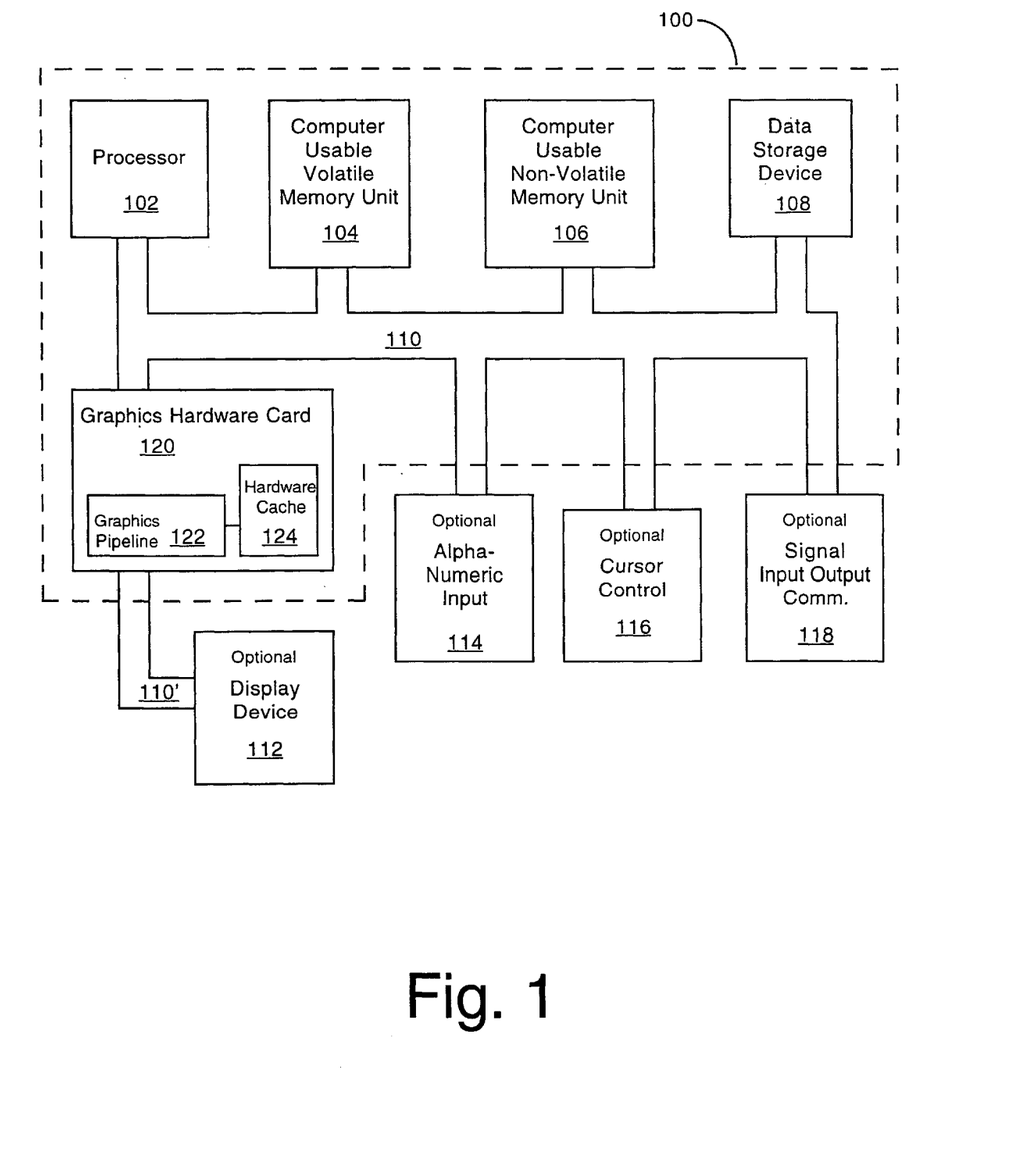
FIG. 1 is a block diagram of a computer system used in accordance with the present invention.

FIG. 1 is a block diagram of a computer system 100 used in accordance with the present invention. Within the following discussions of the present invention, certain processes and steps are discussed that are realized, in one embodiment, as a series of instructions (e.g., software program) that reside within computer readable memory units of computer system 100 and executed by processors of computer system 100. When executed, the instructions cause computer system 100 to perform specific actions and exhibit specific behavior which is described in detail below.

In general, computer system 100 of FIG. 1 used by an embodiment of the present invention comprises an address/data bus 110 for communicating information, one or more central processors 102 coupled with bus 110 for processing information and instructions, a computer usable volatile memory unit 104 (e.g., random access memory, static RAM, dynamic RAM, etc.) coupled with bus 110 for storing information and instructions (e.g., graphics software) for central processor(s) 102, a computer usable non-volatile memory unit 106 (e.g., read only memory, programmable ROM, flash memory, EPROM, EEPROM, etc.) coupled with bus 110 for storing static information and instructions for processor(s) 102. Computer system 100 also includes a mass storage computer readable data storage device 108 such as a magnetic or optical disk and disk drive (e.g., hard drive or floppy diskette) coupled with bus 110 for storing information and instructions. Optionally, computer system 100 can include an alphanumeric input device 114 having alphanumeric and function keys coupled to bus 110 for communicating information and command selections to central processor(s) 102, a cursor control device 116 coupled to bus 110 for communicating user input information and command selections to central processor(s) 102, a signal generating device 118 coupled to bus 110 for communicating command selections to processor(s) 102, and a display device 112 coupled to bus 110 for displaying information (e.g., graphics primitives) to the computer user. Optional display device 112 utilized with computer system 100 of the present invention can be a liquid crystal device, cathode ray tube, or any other display device suitable for creating graphic images and alphanumeric characters recognizable to the user.

Computer system 100 of FIG. 1 also provides data and control signals via bus 110 to a graphics hardware unit ("card") 120. The graphics hardware card 120 typically contains a graphics pipeline 122 which includes specialized hardware units for processing a series of display instructions found within a memory stored display list to render graphics primitives. The graphics pipeline 122 supplies data and control signals to a frame buffer (not shown) which refreshes the display device 112 for rendering images (including graphics images). The graphics hardware card 120 is coupled to the display device 112 by an address/data bus 110', which enables them to communicate information. Within one embodiment in accordance with the present invention, graphics hardware card 120 also includes a hardware graphics geometry cache 124, which is coupled to graphics pipeline 122. Hardware graphics geometry cache 124 is described in detail with reference to FIG. 3.

DETAILED DESCRIPTION OF THE OPERATION AND STRUCTURE OF THE PRESENT INVENTION

Figure 2:
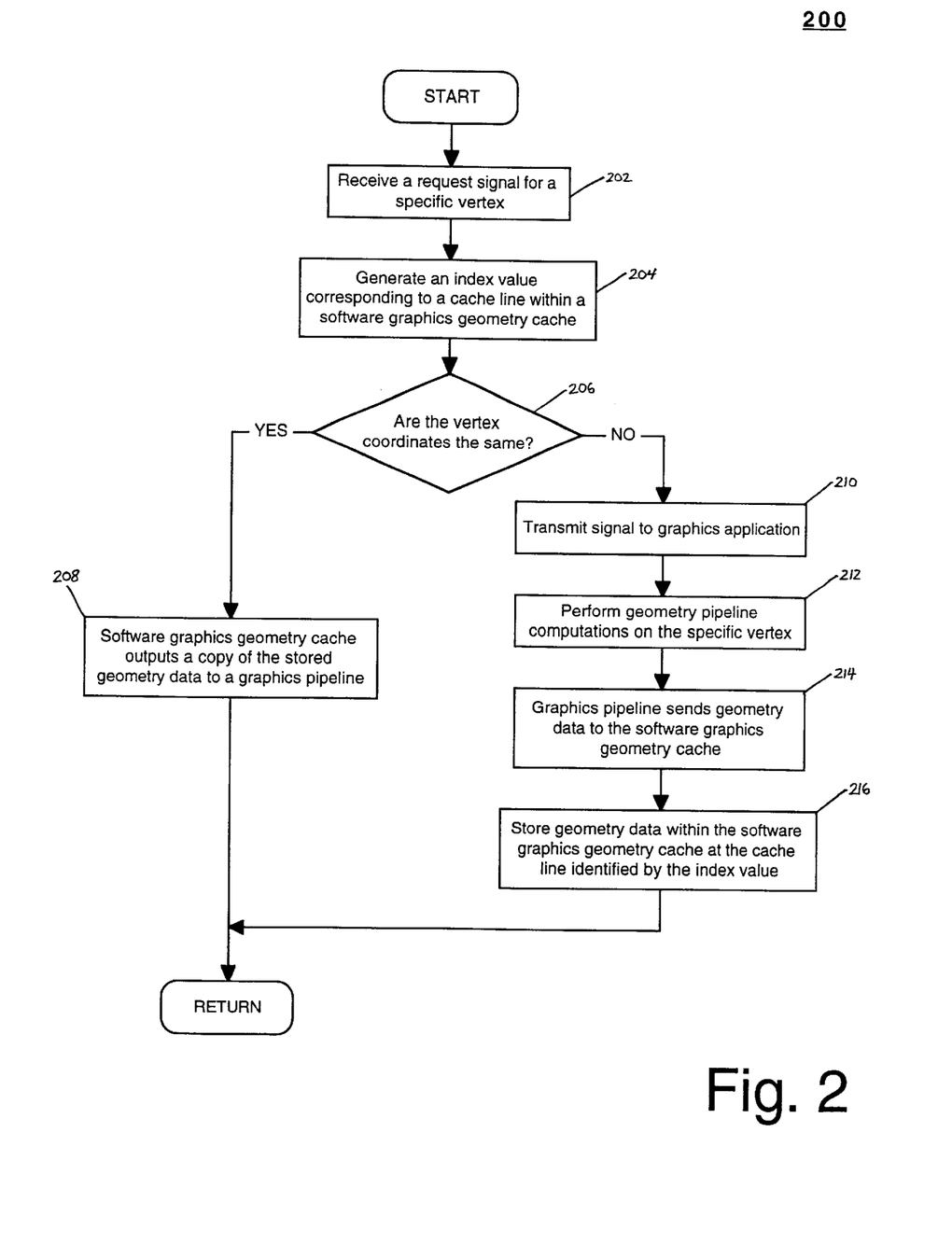
FIG. 2 is a flowchart of steps performed in accordance with one embodiment of the present invention for caching graphics geometry data in order to reduce the computational bandwidth of a graphics pipeline.

With reference to FIG. 2, which is a flowchart 200 of steps performed in accordance with one embodiment of the present invention for caching graphics geometry data in order to reduce the computational bandwidth of a graphics pipeline. Flowchart 200 includes processes of the present invention which, in one embodiment, are carried out by a processor and electrical components under the control of computer readable and computer executable instructions. The computer readable and computer executable instructions reside, for example, in data storage, features such as computer usable volatile memory 104 and/or computer usable non-volatile memory 106 of FIG. 1. Although specific steps are disclosed in flowchart 200, such steps are exemplary. That is, the present invention is well suited to performing various other steps or variations of the steps recited in FIG. 2. It should be appreciated that the steps of flowchart 200 can be performed by software or hardware or any combination of software and hardware.

The general idea of the present embodiment of flowchart 200 is to utilize a software graphics geometry cache together with graphics pipeline 122. The software graphics geometry cache is a relatively small cache (e.g., 128 entries) used for storing and maintaining vertex data. Specifically, the results of computations (e.g., transformed vertices and attributes such as color) performed on vertices by graphics pipeline 122 are cached within the software graphics geometry cache. Furthermore, the cached entries are tagged by their corresponding vertex coordinates. Subsequently, when a particular vertex is specified for graphics pipeline 122, a tag compare is executed through a hashing function to determine whether the graphics geometry data for that particular vertex is stored within the software graphics geometry cache. If a hit occurs during the tag compare, a copy of the graphics geometry data is retrieved from the software graphics geometry cache rather than having to recompute the graphics geometry data for that particular vertex. In this manner, the present embodiment reduces the computational bandwidth of graphics pipeline 122.

In step 202 of FIG. 2, the present embodiment receives a request signal for a specific vertex, which is identified by its vertex coordinate (x, y, z), from a graphics application running on central processor 102. It should be appreciated that the purpose of the request signal from the graphics application is to determine whether or not pre-determined graphics geometry data corresponding to the specified vertex has been previously stored with a software graphics geometry cache.

Within the present embodiment, the software graphics geometry cache is a 128 entry cache where graphics geometry data (e.g., transformation data and/or lighting data) corresponding to different vertices are stored. Furthermore, the location of where particular graphics geometry data is stored within the software graphics geometry cache is based on its corresponding vertex coordinate. Additionally, the graphics geometry data of each vertex which is stored within the software graphics geometry cache is tagged with its corresponding vertex coordinate. It should be appreciated that the present embodiment is well suited for the software graphics geometry cache to be implemented having any amount of entries.

At step 204, the present embodiment generates an index value which corresponds to a specific cache line within the software graphics geometry cache. Within the present embodiment, a hashing function is used at step 204 to generate the index value which maps into the software graphics geometry cache. Specifically, the hashing function utilizes part of the vertex coordinate to generate the index value which corresponds to a particular cache line within the software graphics geometry cache. It is appreciated that the operation of a hashing function is well known by those of ordinary skill in the art.

In step 206 of FIG. 2, the present embodiment determines whether the vertex coordinate of the specified vertex is the same as the vertex coordinate stored at the cache line identified by the determined index value. Within the present embodiment, a tag compare is performed at step 206 in order to determine whether the two vertex coordinates are equal. It is appreciated that the operation of a tag compare is well known by those of ordinary skill in the art. At step 206, if the vertex coordinate of the specified vertex is not the same as the vertex coordinate stored at the cache line, the present embodiment proceeds to step 210. However, if the vertex coordinate of the specified vertex is the same as the vertex coordinate stored at the cache line, the present embodiment proceeds to step 208.

At step 208, the present embodiment of the software graphics geometry cache outputs from the particular cache line a copy of the stored graphics geometry data along with its vertex coordinate to graphics pipeline 122 over bus 110. After completing step 208, the present embodiment of flowchart 200 is exited.

At step 210 of FIG. 2, the present embodiment transmits a signal to the graphics application indicating that the specified vertex should be sent down graphics pipeline 122 where computations (e.g., transformation computations and/or lighting computations ) are performed corresponding to the specified vertex. In step 212, graphics pipeline 122 performs computations corresponding to the specified vertex. It should be appreciated that the performance of graphics pipeline computations are well known by those of ordinary skill in the art. At step 214, graphics pipeline 122 transmits the resulting graphics geometry data corresponding to the specified vertex to the software graphics geometry cache over bus 110 and also to the frame buffer located on graphics hardware card 120. In step 216, the present embodiment receives the graphics geometry data from graphics pipeline 122 and stores it, tagged with its corresponding vertex coordinate, within the software graphics geometry cache at the cache line identified by the index value determined at step 204. After completing step 216, the present embodiment of flowchart 200 is exited.

It should be appreciated that one of the purposes of storing the graphics geometry data within the software graphics geometry cache during flowchart 200 is to avoid having graphics pipeline 122 recalculate that same data multiple times. Therefore, since a vertex can be shared by multiple primitives within a graphics image, a copy of the stored data can be output from the software graphics geometry cache multiple times during an image rendering process of the graphics image. In this manner, the present embodiment reduces the computational bandwidth of graphics pipeline 122. It should be further appreciated that when there are global state changes (e.g., change of the transformation matrix) during the rendering process, the present embodiment invalidates all of the entries stored within the software graphics geometry cache.

Figure 3:
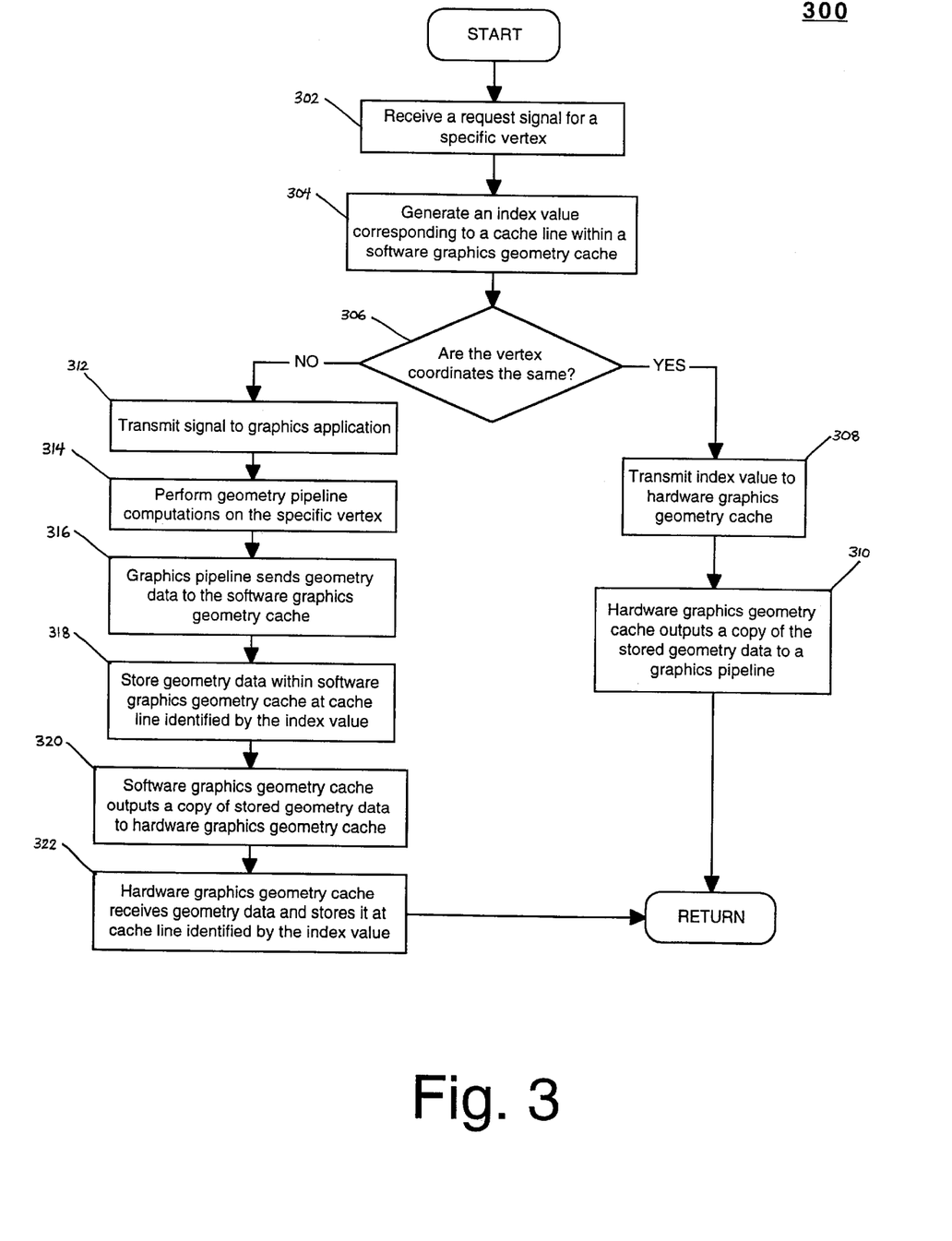
FIG. 3 is a flowchart of steps performed in accordance with one embodiment of the present invention for caching graphics geometry data within a software cache and a hardware cache.

Referring now to FIG. 3, which is a flowchart 300 of steps performed in accordance with one embodiment of the present invention for caching graphics geometry data within a software cache and a hardware cache. As such, the present embodiment is able to conserve bus bandwidth between central processor 102 and graphics hardware card 120 while conserving computational bandwidth of graphics pipeline 122. Flowchart 300 includes processes of the present invention which, in one embodiment, are carried out by a processor and electrical components under the control of computer readable and computer executable instructions. The computer readable and computer executable instructions reside, for example, in data storage features such as computer usable volatile memory 104 and/or computer usable non-volatile memory 106 of FIG. 1. Although specific steps are disclosed in flowchart 300, such steps are exemplary. That is, the present invention is well suited to performing various other steps or variations of the steps recited in FIG. 3.

The basic idea of the present embodiment of flowchart 300 is to utilize a software graphics geometry cache and hardware graphics geometry cache 124 in conjunction with graphics pipeline 122. Each of the graphics geometry caches is a relatively small cache (e.g., 128 entries) used for storing and maintaining vertex data. Specifically, the results of computations (e.g., transformed vertices and final colors) performed on vertices by graphics pipeline 122 are cached within both of the graphics geometry caches. Furthermore, within both of the graphics geometry caches, each cached entry is tagged by its corresponding vertex coordinate. It should be appreciated that hardware graphics geometry cache 124 stores data at the same location that the software graphics geometry cache stores the same data. Subsequently, when a particular vertex is specified for the graphics pipeline, a tag compare is executed through a hashing function to determine whether the graphics geometry data for that particular vertex is stored within the software graphics geometry cache. If a hit occurs during the tag compare, an index value identifying where the graphics geometry data is stored within the software graphics geometry cache is transmitted to hardware graphics geometry cache 124 over bus 110. Subsequently, hardware graphics geometry cache 124 outputs a copy of the graphics geometry data rather than having to recompute the graphics geometry data for that particular vertex. In this manner, the present embodiment conserves computational bandwidth of graphics pipeline 122 while conserving the bandwidth of bus 110 between central processor 102 and graphics hardware card 120.

In step 302 of FIG. 3, the present embodiment receives a request signal for a specific vertex, which is identified by its vertex coordinate (x, y, z), from a graphics application running on central processor 102. It should be appreciated that the purpose of the request signal from the graphics application is to determine whether or not pre-determined graphics geometry data corresponding to the specified vertex has been previously stored with a software graphics geometry cache.

Within the present embodiment, the software graphics geometry cache and hardware graphics geometry cache 124 are each a 128 entry cache where graphics geometry data (e.g., transformation data and/or lighting data) corresponding to different vertices are stored. Furthermore, the location of where particular graphics geometry data is stored within the software graphics geometry cache and hardware graphics geometry cache 124 is based on its corresponding vertex coordinate. Additionally, the graphics geometry data of each vertex which is stored within the software graphics geometry cache and hardware graphics geometry cache 124 is tagged with its corresponding vertex coordinate. In other words, hardware graphics geometry cache 124 mirrors the software graphics geometry cache. It should be appreciated that the present embodiment is well suited for the software graphics geometry cache and hardware graphics geometry cache 124 to be implemented having any amount of entries.

At step 304, the present embodiment generates an index value which corresponds to a specific cache line within the software graphics geometry cache and hardware graphics geometry cache 124. Within the present embodiment, a hashing function is used at step 204 to generate the index value which maps into the software graphics geometry cache and hardware graphics geometry cache 124. Specifically, the hashing function utilizes part of the vertex coordinate to generate the index value which corresponds to a particular cache line within the software graphics geometry cache and hardware graphics geometry cache 124. It is appreciated that the operation of a hashing function is well known by those of ordinary skill in the art.

In step 306 of FIG. 3, the present embodiment determines whether the vertex coordinate of the specified vertex is the same as the vertex coordinate stored at the cache line within the software graphics geometry cache identified by the determined index value. Within the present embodiment, a tag compare is performed at step 306 in order to determine whether the two vertex coordinates are equal. It is appreciated that the operation of a tag compare is well known by those of ordinary skill in the art. At step 306, if the vertex coordinate of the specified vertex is not the same as the vertex coordinate stored at the cache line of the software graphics geometry cache, the present embodiment proceeds to step 312. However, if the vertex coordinate of the specified vertex is the same as the vertex coordinate stored at the cache line of the software graphics geometry cache, the present embodiment proceeds to step 308.

At step 308, the present embodiment transmits the index value to hardware graphics geometry cache 124 over bus 110. It should be appreciated that the index value of the present embodiment corresponds to the same cache line within the software graphics geometry cache as it does within hardware graphics geometry cache 124. In step 310, the present embodiment of hardware graphics geometry cache 124 outputs to graphics pipeline 122 a copy of the graphics geometry data and corresponding vertex coordinate which are stored at the cache line identified by the received index value. After completing step 310, the present embodiment of flowchart 300 is exited.

At step 312 of FIG. 3, the present embodiment transmits a signal to the graphics application indicating that the specified vertex should be sent down graphics pipeline 122 where computations (e.g., lighting computations and/or transformation computations ) are performed corresponding to the specified vertex. In step 314, graphics pipeline 122 performs computations corresponding to the specified vertex. As mentioned above, the performance of graphics pipeline computations are well known by those of ordinary skill in the art. At step 316, graphics pipeline 122 transmits the resulting graphics geometry data corresponding to the specified vertex to the software graphics geometry cache over bus 110 and also to the frame buffer located on graphics hardware card 120. In step 318, the present embodiment receives the graphics geometry data from graphics pipeline 122 and stores it, tagged with its corresponding vertex coordinate, within the software graphics geometry cache at the cache line identified by the index value determined at step 304.

At step 320, the present embodiment of the software graphics geometry cache outputs to hardware graphics geometry cache 124 over bus 110 a copy of the newly stored graphics geometry data, tagged with its corresponding vertex coordinate, along with the index value determined at step 304. In step 322, the present embodiment receives the graphics geometry data, tagged with its corresponding vertex coordinate, from the software graphics geometry cache and stores it within hardware graphics geometry cache 124 at the cache line identified by the index value. After completing step 322, the present embodiment of flowchart 300 is exited.

It should be appreciated that one of the purposes of storing the graphics geometry data within the software graphics geometry cache and hardware graphics geometry cache 124 during flowchart 300 is to avoid having graphics pipeline 122 recalculate that same data multiple times. Therefore, since a vertex can be shared by multiple primitives within a graphics image, a copy of the stored data can be output from hardware graphics geometry cache 124 multiple times during an image rendering process of the graphics image. In this manner, the present embodiment reduces the computational bandwidth of graphics pipeline 122. Furthermore, by utilizing hardware graphics geometry cache 124 within the present embodiment, the graphics geometry data does not have to be sent multiple times over bus 110 to graphics pipeline 122. In this fashion, the present embodiment conserves the transmission bandwidth of bus 110. It should be further appreciated that when there are global state changes (e.g., change of the transformation matrix) during the rendering process, the present embodiment invalidates all of the entries stored within the software graphics geometry cache and hardware graphics geometry cache 124.

Thus, the present invention provides a method and system for providing increased operational efficiency to a graphics pipeline which is functioning in conjunction with a computer system. Specifically, one embodiment in accordance with the present invention provides a reduction in the computational bandwidth of the graphics pipeline. Furthermore, another embodiment in accordance with the present invention provides the above mentioned advantage together with a reduction in the use of the bus bandwidth between a central processor and graphics hardware card.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for improving performance of a graphics pipeline, said method comprising the steps of:
   - (a) caching graphics data corresponding to a vertex of a graphics image within a first memory device;
   - (b) caching said graphics data corresponding to said vertex within a second memory device, wherein said first and second memory device are in communication via a bus;
   - (c) determining whether said graphics data corresponding to a requested vertex has been previously cached within said first memory device; and
   - (d) outputting a signal to said second memory device, wherein said signal indicates to said second memory device where said graphics data is stored within said second memory device if said graphics data corresponding to the requested vertex has been previously cached within said first memory device.

2. The method for improving performance of a graphics pipeline as described in claim 1 wherein step (c) comprises:
   - c1) performing a hash function to determine whether said graphics data corresponding to said vertex has been previously cached within said first memory device.

3. The method for improving performance of a graphics pipeline as described in claim 1 wherein step (c) comprises:
   - c1) performing a tag compare to determine whether said graphics data corresponding to said vertex has been previously cached within said first memory device.

4. A method for improving performance of a graphics pipeline, said method comprising the steps of:
   - (a) caching graphics data corresponding to a vertex of a graphics image to a first cache address in a first memory device
   - (b) caching said graphics data corresponding to said vertex to a cache address that is the same as the first cache address in a second memory device, such that the second memory device mirrors the first memory device, wherein the first and second memory devices are in communication via a bus; determining whether graphics data corresponding to a requested vertex has been previously cached within said first memory device;
   - (d) determining an index into the first memory device corresponding to the requested vertex, if the requested vertex has been previously cached within said first memory device;
   - (e) sending the index to the second memory device via the bus if the requested vertex has been previously cached within said first memory device and not sending an index to the second memory device via the bus if the requested vertex has not been previously cached within said first memory device; and
   - (f) retrieving said graphics data corresponding to said vertex from said second memory device based on the sent index, said graphics data to be utilized in a graphics pipeline.

5. The method for improving performance of a graphics pipeline as described in claim 4 wherein said step (c) comprises the step of:
   - (c1) performing a tag compare to determine whether said graphics data corresponding to said vertex has been previously cached within said first memory device.

6. The method for improving performance of a graphics pipeline as described in claim 4 wherein said step (a) comprises:
   caching said graphics data corresponding to said vertex of said graphics image within said first memory device, wherein said first memory device is implemented using software.

7. The method for improving performance of a graphics pipeline as described in claim 4 wherein said step (b) comprises:
   caching said graphics data corresponding to said vertex within said second memory device, wherein said second memory device comprises a hardware cache.

8. The method for improving performance of a graphics pipeline as described in claim 4 wherein said step (b) comprises:
   caching said graphics data corresponding to said vertex within said second memory device, wherein said second memory device comprises a hardware cache located with graphics hardware.

9. The method for improving performance of a graphics pipeline as described in claim 1 wherein said second memory device is directly coupled to said graphics pipeline and is not coupled to said graphics pipeline via a bus.

10. The method for improving performance of a graphics pipeline as described in claim 4 wherein said second memory device is directly coupled to said graphics pipeline and is not coupled to said graphics pipeline via a bus.

11. An apparatus for improving graphic processing performance, comprising:

a graphics pipeline; and a first cache coupled to the graphics pipeline;

wherein the graphics pipeline communicates with a processor via a bus and the processor includes a second cache, the first and second cache both store mirrored graphic data corresponding to a plurality of vertices of a graphics image, and if a selected vertex of the plurality of vertices is included in the second cache, the apparatus receives an indication representative of the selected vertex and retrieves the graphic data corresponding to the selected vertex from the first cache.

12. The apparatus as described in claim 11, wherein the first cache comprises a hardware cache and the second cache comprises a software implemented cache.

13. The apparatus as described in claim 12, wherein the indication representative of the selected vertex comprises an index into the first and second cache.

14. The apparatus as described in claim 13, wherein the index is generated via a hash function on the coordinates of the selected vertex.

15. The method for improving performance of a graphics pipeline as described in claim 1 wherein said step (c) comprises performing a hash function to determine whether said graphics data corresponding to said vertex has been previously cached within said first memory device.

16. The method for improving performance of a graphics pipeline as described in claim 1 wherein the graphics data in the first memory device mirrors the graphics data in the second memory device.

17. The method for improving performance of a graphics pipeline as described in claim 1 wherein said step (a) comprises:

caching said graphics data corresponding to said vertex of said graphics image within said first memory device, wherein said first memory device is implemented using software.

18. The method for improving performance of a graphics pipeline as described in claim 1 wherein said step (b) comprises:

caching said graphics data corresponding to said vertex within said second memory device, wherein said second memory device comprises a hardware cache.

19. The method for improving performance of a graphics pipeline as described in claim 1 wherein said step (b) comprises:

caching said graphics data corresponding to said vertex within said second memory device, wherein said second memory device comprises a hardware cache located with graphics hardware.

20. The method for improving performance of a graphics pipeline as described in claim 1 wherein said step (a) comprises caching said graphics data via a hashing function.

21. The method for improving performance of a graphics pipeline as described in claim 1 wherein said step (b) comprises caching said graphics data via a hashing function.

22. The method for improving performance of a graphics pipeline as described in claim 4 wherein said step (c) comprises performing a hash function to determine whether said graphics data corresponding to said vertex has been previously cached within said first memory device.

23. The method for improving performance of a graphics pipeline as described in claim 4 wherein said step (a) comprises caching said graphics data via a hashing function.

24. The method for improving performance of a graphics pipeline as described in claim 4 wherein said step (b) comprises caching said graphics data via a hashing function.

* * * * *

UNITED STATES PATENT AND TRADEMARK OFFICE
CERTIFICATE OF CORRECTION

PATENT NO. : 6,690,380 B1  Page 1 of 1
DATED : February 10, 2001
INVENTOR(S) : Hussain et al.

It is certified that error appears in the above-identified patent and that said Letters Patent is hereby corrected as shown below:

<u>Column 10,</u>
Line 13, after subparagraph (a), insert -- ; --.
Line 19, after "bus;" and on new line, insert -- (c) --.

Signed and Sealed this

Fifteenth Day of June, 2004

JON W. DUDAS
*Acting Director of the United States Patent and Trademark Office*